(12) United States Patent
Ogilvie

(10) Patent No.: US 6,711,608 B1
(45) Date of Patent: Mar. 23, 2004

(54) METHOD FOR INCLUDING A SELF-REMOVING CODE IN A SELF-REMOVING MESSAGE

(76) Inventor: John W. L. Ogilvie, 1211 E. Yale Ave., Salt Lake City, UT (US) 84105

( * ) Notice: Subject to any disclaimer, the term of this patent is extended or adjusted under 35 U.S.C. 154(b) by 301 days.

(21) Appl. No.: 09/399,066

(22) Filed: Sep. 18, 1999

Related U.S. Application Data

(60) Provisional application No. 60/104,138, filed on Oct. 14, 1998, and provisional application No. 60/101,517, filed on Sep. 23, 1998.

(51) Int. Cl.$^7$ ............................................. G06F 15/16
(52) U.S. Cl. ..................................... 709/206; 709/202
(58) Field of Search ............................... 709/200, 202, 709/206, 246, 249; 707/10; 345/333; 455/415

(56) References Cited

U.S. PATENT DOCUMENTS

| | | | |
|---|---|---|---|
| 4,406,626 A | | 9/1983 | Anderson et al. ........... 434/169 |
| 5,029,104 A | | 7/1991 | Dodson et al. ............. 364/514 |
| 5,036,518 A | * | 7/1991 | Tseung ....................... 714/748 |
| 5,125,075 A | | 6/1992 | Goodale et al. ............ 395/200 |
| 5,283,856 A | | 2/1994 | Gross et al. ................. 395/51 |
| 5,479,472 A | | 12/1995 | Campana, Jr. et al. ........ 379/58 |
| 5,504,897 A | | 4/1996 | Gans et al. .................. 395/650 |
| 5,588,009 A | | 12/1996 | Will ............................. 371/33 |
| 5,619,594 A | | 4/1997 | Melen ........................ 382/233 |
| 5,623,600 A | | 4/1997 | Ji et al. .................. 395/187.01 |
| 5,632,018 A | * | 5/1997 | Otorii ......................... 709/200 |
| 5,649,186 A | * | 7/1997 | Ferguson ..................... 707/10 |
| 5,657,461 A | * | 8/1997 | Harkins et al. ............. 345/333 |
| 5,668,646 A | | 9/1997 | Katayama et al. .......... 358/530 |
| 5,692,181 A | * | 11/1997 | Anand et al. ................ 707/102 |
| 5,692,183 A | | 11/1997 | Hapner et al. .............. 395/614 |
| 5,694,616 A | | 12/1997 | Johnson et al. ............. 395/860 |
| 5,742,668 A | * | 4/1998 | Pepe et al. ................... 455/415 |
| 5,786,817 A | | 7/1998 | Sakano et al. .............. 345/339 |
| 5,787,414 A | | 7/1998 | Miike et al. ................... 707/2 |
| 5,802,320 A | * | 9/1998 | Baehr et al. ................ 709/249 |
| 5,812,773 A | | 9/1998 | Norin ..................... 395/200.34 |
| 5,819,046 A | | 10/1998 | Johnson ................. 395/200.57 |
| 5,826,269 A | | 10/1998 | Hussey ........................ 707/10 |
| 5,859,967 A | | 1/1999 | Kaufeld et al. ............. 395/186 |
| 5,958,005 A | | 9/1999 | Thorne et al. .............. 709/202 |
| 6,072,942 A | * | 6/2000 | Stockwell et al. .......... 709/206 |

OTHER PUBLICATIONS

Hansen, "Enhancing documents with embedded programs: How Ness extends insets in the Andrew Toolkit", 1990, pp. 23–32, IEEE.*

"AOL.com", no later than Sep. 18, 1999, p. 1.

"Bbase7 for Windows, Netscape, Eudora ... ", no later than Aug. 22, 1999, p. 1.

(List continued on next page.)

*Primary Examiner*—Le Hien Luu
(74) *Attorney, Agent, or Firm*—Computer Law + +

(57) ABSTRACT

Methods, articles, signals, and systems are provided for protecting email message contents. A self-removing message is designated as such by the message's originator, and a self-removal enhancement such as self-removal code or self-removal indicators are added to conventional message content before the message is transmitted over a computer network toward one or more recipients. Copies of the message may be removed from intermediate network nodes by software which recognizes, and acts in response to, self-removal indicators. At the recipient's location, the message is displayed and then removed from disk and from memory without additional effort by the recipient. Thus, the burden of removing unsolicited email messages is transferred from recipients to the system and the message's originator. Security of messages may also be enhanced by reducing the number of copies of confidential message content and/or the accessible life span of those copies.

12 Claims, 2 Drawing Sheets

OTHER PUBLICATIONS

"BugTraq", May 5, 1999, p. 1.
"Computational Mail as Network Infrastructure", N. S. Borenstein, no later than Jun. 29, 1999, pp. 1–11.
"DECUServe VMS Conference 1375.3", Jul. 11, 1991, p. 1.
"Dynamic Software Reconfiguration", A. Beitz, *Queensland University of Technology*, no later than Sep. 22, 1998, pp. 1–7.
"Email With a Mind of Its Own", N. Borenstein, *ULPAA '94. Barcelona*, 1994, pp. 1–17.
"FileOpen PDF 2.1", *FileOpen Systems*, no later than Sep. 22, 1998, pp. 1–3.
"FileWave", *Wave Research NV*, 1997–1999, pp. 1–3.
"Get it Now", no later than Sep. 22, 1998, p. 1.
"Global Email Meltdown!", Seth Ross, *The Daily Flame*, Sep. 28, 1998, pp. 1–2.
"High Tech, Low Privacy", *ABA Journal*, May 1999, pp. 52–57.
"How do I recover deleted mail messages?", *University of Cambridge Computing Service*, Feb. 23, 1998, pp. 1.
"HyperGASP", *Caliban*, no later than Sep. 22 1998, pp. 1–4.
"Lately whenever I look at my mail in Pine, . . . ", Jun. 5, 1997, pp. 1–2.
"The Lewinsky Story", J. Kronholz and R. Quick, *The Wall Street Journal*, Sep. 22, 1998, pp. 1–4.
"Memory Management Instructions on the PDP–8", *PDP–8 Programmer's Reference Manual*, no later than Sep. 22, 1998, pp. 1–4.
"Mobile Agents White Paper", J. White, *General Magic*, 1996, p. 1–30.
"Ordering the Fem–Dom Software", no later than Sep. 22, 1998, p. 1.
"OS/2 Device Driver Frequently Asked Questions", *Abbotsbury Software Ltd. UK*, Apr. 28, 1996, pp. 1–2.
"PopUp Ads", *Blue Platypus, LLC*, 1997, pp. 1–11.
"Press Release", *Genio USA*, Dec. 9, 1996, p. 1.
"Saving and Printing an E–mail Message", no later than Sep. 22, 1998, pp. 1–2.
"SECURED anti trojan security", no later than 89/22/99, pp. 1–2.
"Self–Deleting Typo", *Digital Antic*, Apr. 1985, pp. 1–3.
"Software: WPS TrashCan 2.4", *Apr. 4, 1996*, p. 1–2.
"QuickSend—The Greatest E–mail Utility on Earth", *E–virtual Corp.*, 1997–1999, p. 1.
"Sun—What's Happening", *Sun Microsystems, Inc.*, 1994–1999, pp. 1–2.
"Self Modifying Code", R. Henry, Jul. 14, 1989, p. 1.
"Shredded95 update pick", *SoftSeek*, no later than Sep. 22, 1998, pp. 1–2.
"Shredder 2.0", *Stratfor Systems, Inc.*, no later than Sep. 22, 1998, pp. 1–7.
"Shroom.doc", no later than Sep. 22, 1998, p. 1–4.
"Some wxwin questions", C. Cockburn, Dec. 14, 1993, p. 1.
"Writing Self–Modifying Code in Windows95", no later than Sep. 22, 1998, pp. 1–2.
"Software Abroad", Jul. 11, 1997, p. 1.
"Visual C++", no later than Sep. 22, 1998, p. 1.
"Wave Research Demonstrates FileWave 3.0 at MacWorld '98", Jan. 6, 1998, pp. 1–2.
"Yahoo! Net Events", *Yahoo! Inc.*, 1994–1999, p. 1.
"Yarra Ranges", no later than Aug. 22, 1998, p. 1–2.
PCT Search Report, Dec. 14, 1999 for PCT/US99/21427.
Software Firm Tries to Profit From Protection, Wall Street Journal B16, Feb. 10, 2000.

Authentica web pages, including Press Release, Apr. 5, 1999 through no later than Mar. 27, 2000.
"The Eroded Self", New York Times Magazine, pp. 46–53, 66–68, 129; Apr. 30, 2000.
Disappearing Inc. Email policy management systems, title, pp. 1–8; Feb. 2000 .
disappearing.com web pages, pp. 1–13; no later than May 05, 2000, some earlier
Disappearing Email™ Service Fact Sheet, one page; Feb, 2000.
Disappearing Inc. Makes Email Disappear, pp. 1–4; Dec. 14, 1999.
Pool! Old E–Mail Disappears, pp. 1–2; Oct. 6, 1999.
A Virtual Shredder, pp. 1–2; Oct. 7, 1999.
Disappearing Inc. Keeps Email Messages Private, pp. 1–3; Oct. 8, 1999.
This e–mail will self–destruct in . . . , pp. 1–3, Oct. 11, 1999.
Disappearing Inc. helps e–mail fade from sight, pp. 1–3; Oct. 25, 1999.
Self–destructing e–mail: pragmatic or paranoid?, pp. 1–5; Nov. 29, 1999.
'Self–destruct' e–mail offers virtual privacy, pp. 1–2; Nov. 23, 1999.
ziplip web pages, pp. 1–13; no later than May 06, 2000.
"E–mail Protection Advances with New Technologies", Jan. 2000.
"Steps toward ending e–mail insecurity", Oct. 3, 1999.
"Prying eyes, keep out", May 28, 2000.
"Electronic Document Retention: Reducing Potential Liability for Email", date unknown.
Disappearing Inc. flyer, 2000.
"Disappearing Email Finally Appears", Feb. 7, 2000.
"New 'Disappearing Email' service", Feb. 16, 2000.
Disappearing Inc. Fact Sheet, pp. 1–8, no later than Jun. 28, 2000.
"Total E–MailPrivacy a New Service", Jun. 28, 1999.
ZipLip: Wireless Overview, no later than Jun. 30, 1900.
ZipLip FAQ, no later than Jun. 30, 2000, pp. 1–5.
ZipLip: Help, no later than Jun. 30, 2000, pp. 1–4.
Interosa™ flyer, 2000, pp. 1–2.
interosa.com web pages, no later than Jun. 30, 2000 and some clearly earlier, pp. 1–6
"InteRosa takes a stab at secure Email", Sep. 28, 1999.
"SunDog Closes Sales of QVtech", Apr. 17, 2000.
"E–mail Start–up Offers Security Software", Oct. 4, 1999.
"Secure Your E–Mail With Interosa", Oct. 26, 1999.
"Hush Products", no later than Jun. 29, 2000 and some clearly earlier, pp. 1–10.
"Microsoft patches Outlook", May 16, 2000.
"Email Spam", no later than Jul. 08, 2000.
Eudora Pro 3.0 screen shot and help excerpts, no later than 1997, pp. 1–4.
"Rules to filter junk mail in Microsoft Outlook", May 22, 2000.
"Managing Email With Outlook Rules", no later than Jul. 11, 2000, pp. 1–4.
Novell GroupWise™ User's Guide, 1993–1994, sections on In Box, Out Box, Trash, Send Mail, Remote Basics, More About Remote.
M. Vigen, "Business or Pleasure? Understanding AOL Instant Messenger and the Rapidly Evolving Future of Instant Messaging", May 2000.
Other Application Claims (claims of application 1384.2.6G: 09/619,933 filed Jul. 20, 2000).

E–Mail Goes Postal, Wall Street Journal, B1, Jul. 31, 2000.

Harris Interactive Sues AOL. . ., Wall Street Journal, A12, Aug. 2, 2000.

MAPS Can Be a Roadblock to E–Mail Access, Wall Street Journal, B5, Aug. 3, 2000.

Jantz, R., "Pagis Pro 97: A Scanning Secret Weapon", *1997 PC World Communications* (from the World Wide Web).

International Search Report, PCT/US00/24157, Feb. 16, 2001.

Hansen, "Enhancing Documents with embedded programs: How Ness extends insets in the Andrew ToolKit", IEEE, 1990.

Miller, "Can Congress Can Spam?", Mar. 28, 2001.

Summary of Anti–Spam Bills from www.techlawjournal.com site, Apr. 24, 2001.

Hamilton, "You've Got Mail (You Don't Want)", Wall Street Journal R21, Apr. 23, 2001.

Dreazen, "To Annoyance of Cellphone Users, Text Messages May Well Be Spam", Wall Street Journal B1, Mar. 28, 2001

* cited by examiner

METHOD FOR INCLUDING A SELF-REMOVING CODE IN A SELF-REMOVING MESSAGE

RELATED APPLICATIONS

This application claims priority to the following commonly owned provisional patent applications: serial No. 60/101,517 filed Sep. 23, 1998, and serial No. 60/104,138 filed Oct. 14, 1998.

FIELD OF THE INVENTION

The present invention relates to the technical goal of facilitating the use of email (electronic mail) and similar broadcast or targeted transmission mechanisms by protecting confidential and proprietary information which is transmitted through such mechanisms, and/or by automatically disposing of information copies after their receipt. The invention relates more particularly to methods, systems, signals, and articles of manufacture for embedding information in a program or file which removes itself from the computer system after being opened and read by an authorized reader.

TECHNICAL BACKGROUND OF THE INVENTION

Email is a very useful tool for promoting communication between people who are separated by distance, by different working hours, or both. However, email is sometimes inconvenient and sometimes less secure than desired. Both of these shortcomings hinder the use of email as a mechanism for broadcasting information to many people and/or transmitting information to one or a few specific targets.

For instance, email creates security concerns which have not been fully addressed. An email transmission often creates multiple copies of the emailed message on Internet Service Provider servers and other nodes in a computer network. Email and similar mechanisms are made less secure by the possibility of unauthorized access to copies of transmitted information.

One approach to protecting confidential or proprietary information in email messages is for an email recipient to delete the messages by using the email Delete command, by dragging the messages in question to a trash can, or by similar steps. However, files and messages deleted in this manner are often simply marked as free space, and little or none of the contents of the deleted items is actually destroyed. Accordingly, programs have been developed which electronically "shred" files by overwriting the file contents. A similar step could be taken to electronically "shred" specific email messages, although this has apparently not yet been done. Some electronic shredding programs also seek out any copies of the files that are stored in one or more predetermined locations and overwrite those copies.

However, such electronic shredding programs are limited in scope in that they only shred local copies of the message. Copies are often stored elsewhere, such as on the message originator's computer and in many cases on intervening network nodes such as the message originator's ISP's server. These remote copies are not reached by a conventional shredder. Accordingly, some copies of the email may remain even after the electronic shredding process is "complete." One solution would provide a shredding program based on the message recipient's system with destructive access to the message originator's system. However, this would pose serious security risks and would also create logistical problems and administrative burdens.

Another approach to protecting confidential or proprietary information in email messages is for an email originator to encrypt the messages, which are then decrypted by the recipient to obtain a "plaintext" version of the message contents. Encryption and shredding can be used as alternatives or in conjunction with each other. Even if some encrypted copies remain after others are shredded, protection is provided to the extent that serious effort is needed to decrypt the email message. Encryption software is increasingly available, and a commercially viable infrastructure supporting it through the use of public keys, certificates, and the like is beginning to develop.

However, serious challenges are still posed by encryption key management in general, and are posed in particular by the difficulty of making certain that the message originator and the authorized message recipient have the necessary key or keys and that other persons do not. Also, once a copy of the encrypted message is made, that copy may be retrieved at some later time (possibly much later) and removed to a convenient site where it can be subjected to attack without any protection except the encryption itself.

Email also creates annoyances which have not been fully addressed. One common source of annoyance is "spam" email, namely, unsolicited email sent to multiple recipients. Unlike passive advertising, such as pop-up and banner ads on websites, and ads in more traditional print, radio, or television media, "spam" email seeks out its audience, and thrusts itself into the viewer's field of attention without being invited. This can be very annoying because it interrupts other activities, consumes system resources, and perhaps most importantly, requires active efforts by recipients who want to dispose of these unwanted messages.

Some email systems provide filters that detect at least some incoming unsolicited email and either deletes it or, more typically, places it in a directory or folder reserved for such messages. But filters sometimes err, either by characterizing as unsolicited email a message that is not, or by failing to detect unsolicited email and letting it through with the normal correspondence from familiar senders. Thus, it would be helpful to provide some alternate or additional means for disposing of unsolicited email.

Some unsolicited email includes a statement that sending a reply with "REMOVE" in the subject field will remove the recipient from the mailing list. It has been alleged, however, that any reply to some such unsolicited email will simply confirm that the address to which the unsolicited mail was sent is "good" (meaning someone actually looked at the unsolicited email) and that a reply asking to be removed from the mailing list may therefore have an effect opposite from the intended effect. If this is so, then only addresses from which no reply is received would have a chance of being removed from the list.

Television and radio "spots" which broadcast an advertisement without taking up storage space on the receiver (televisions and radios generally lack permanent storage such as hard disks) are known, although this characterization of them as not requiring recipient storage resources and proactive deletion by the recipient may be new.

Accordingly, it would be an advancement to provide an improved approach to protecting against the unwanted disclosure of confidential or proprietary information by reducing the risk of improper access to copies of an email message.

Likewise, it would be an advancement to provide an improved approach to email which moves the email disposal burden off the shoulders of the recipient. In particular and without limitation, it would be an advance to make public notices sent through email less onerous to recipients, and likewise to make email advertisements (including without limitation coupons, contact information, descriptions of goods and/or services, comparisons, and promotional materials) available to multiple recipients without requiring that recipients affirmatively remove unwanted advertisements from their computer systems or create a reply message having REMOVE or another keyword in the subject, to indicate their lack of interest in the subject matter being advertised.

Such approaches for improved email are disclosed and claimed herein.

BRIEF SUMMARY OF THE INVENTION

The present invention relates to methods, articles, signals, and systems for self-removing email messages. Self-removal of email (or other transmitted digital information presentations) can provide at least two advantages. First, self-removing email can be used to enhance the security of a system by reducing the number of message copies and the life span of those copies. Second, self-removing email can be used to reduce the inconvenience of unsolicited email by making it possible for officials, advertisers, and other broadcast email originators to present messages that do not have to be manually removed by the target audience. A given method, article, signal, or system may use self-removing email to enhance message security, to reduce recipient annoyance, or both.

In some embodiments, self-removing email messages are encrypted with conventional tools and techniques. To further enhance security, a message is closely coupled to executable code which reduces the number of copies of the message. Some versions of the code allow any given copy of the message to be viewed at most once.

In some embodiments, self-removing email messages contain advertisements, but the invention may also be used to broadcast or otherwise transmit self-removing email messages which contain other materials that, at least by default, are not stored long-term on the recipient's hard disk or on other intervening nodes (the self-removal action may sometimes be expressly overridden). For instance, confidential materials, and other materials directed to a limited audience such as public notices (changes in the law, election results, tax auction notices, public hearing announcements, and so on), private club notices, and materials intended for mature audiences, may also be transmitted in self-removing email messages.

Unlike traditional email, self-removing email places the burden of selecting messages for removal and then removing them on the software and on the message originator, instead of on the message recipient. "Spam" advertising methods become much less onerous to recipients if the email carrying the advertisements is as effortlessly ephemeral (from the recipient's point of view) as a television or radio commercial. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing methods, devices, and systems according to the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms are defined, either explicitly or implicitly, both here in the Detailed Description and elsewhere in the application file.

Computers, Networks

Figure 1:
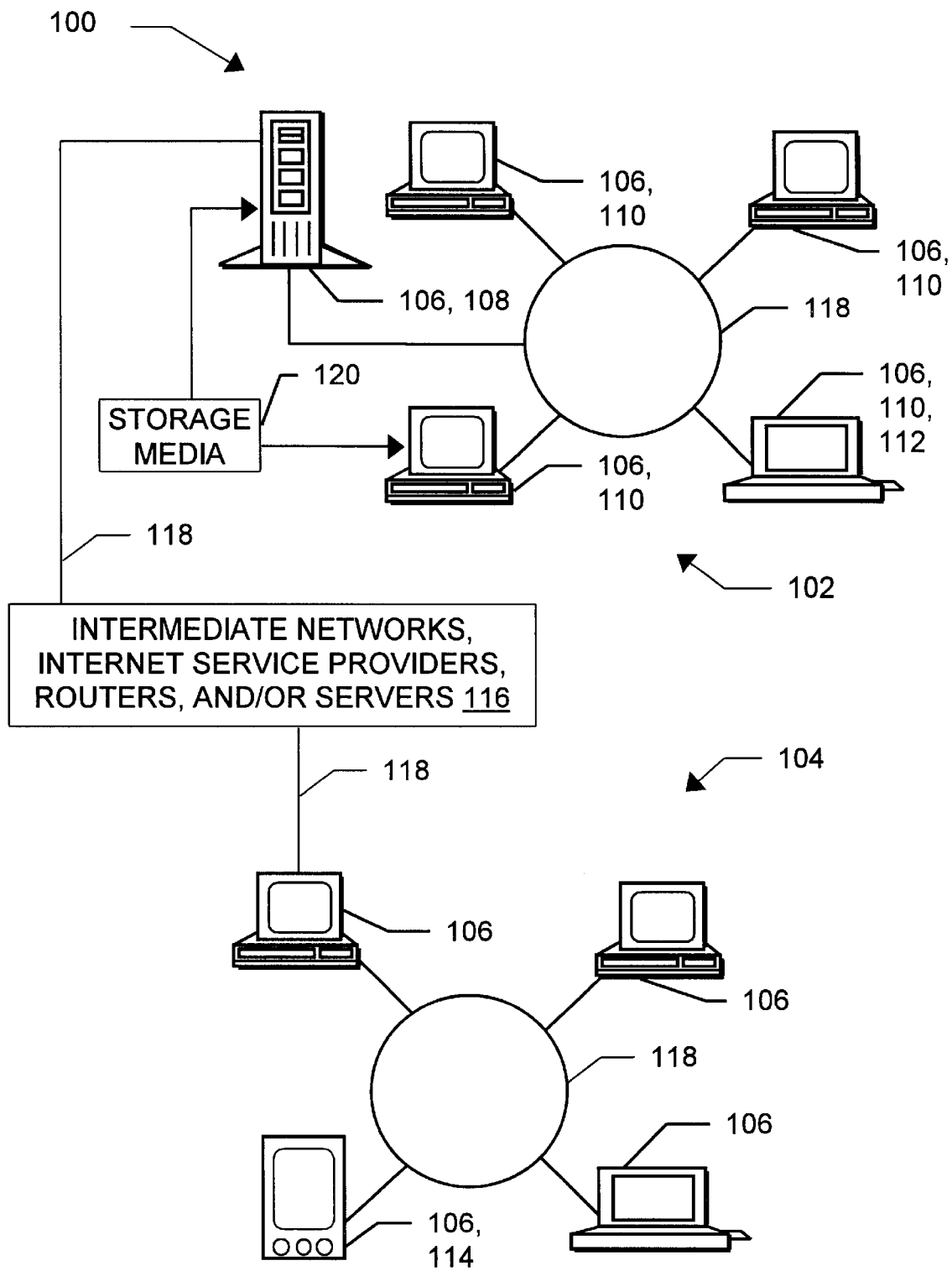
FIG. 1 is a diagram illustrating computers and computer networks suitable for use according to the invention by means of configuration with special-purpose hardware and/or software described herein.

The invention may be used to protect and ultimately remove email messages from an individual computer or from one or more computers in a network, including copies of messages stored on removable media or transmitted over a network link and stored on intermediate nodes. FIG. 1 illustrates a system 100 having several computers and several networks 102, 104, 116 which can be configured according to the invention, but those of skill in the art will understand that suitable computer networks include various networks, such as local area networks, wide area networks, metropolitan area networks, and/or various "Internet" or IP networks such as the World Wide Web, a private Internet, a secure Internet, a value-added network, a virtual private network, an extranet, or an intranet.

The system 100 shown as an example in FIG. 1 includes two local area networks 102, 104. Each network 102, 104 includes at least one computer 106, and each computer 106 includes at least a processor and a memory; computers 106 also include various input devices and/or output devices. The processor may include a general purpose device such as a 80×86, Pentium (mark of Intel), 680×0, or other "off-the-shelf" microprocessor. The processor may include a special purpose processing device such as an ASIC, PAL, PLA, PLD, or other customized or programmable device. The memory may include static RAM, dynamic RAM, flash memory, ROM, CD-ROM, disk, tape, magnetic, optical, or another computer storage medium. The input device(s) may include a keyboard, mouse, touch screen, light pen, tablet, microphone, position sensor, pressure sensor, thermal sensor, or other input hardware with accompanying firmware and/or software. The output device(s) may include a monitor or other display, printer, speech or text synthesizer, solenoid, switch, signal line, or other process controller.

The network 102, which is also by itself one of the many networks suitable for use with the invention, includes a server 108 and several clients 110. Other suitable networks may contain other combinations of servers, clients, and/or peer-to-peer nodes, and a given computer may function both as a client and as a server. For instance, network 104 is a peer-to-peer network. The computers 106 connected by a suitable network may be work-stations, laptop computers 112, disconnectable mobile computers, servers, mainframes, clusters, network computers or lean clients, personal digital assistants or hand-held computing devices 114, or a combination thereof A local network such as network 102 or network 104 may include communications or networking software such as the software available from Novell, Microsoft, Artisoft, and other vendors. A larger network such as the network 100, may combine smaller network(s) and/or devices such as routers and bridges 116. Large or small, the networks may operate using TCP/IP, SPX, IPX, and other protocols over twisted pair, coaxial, or optical fiber cables, telephone lines, satellites, microwave relays, modulated AC power lines, physical media transfer, and/or other data carrying transmission "wires" 118 known to those of skill in the art; for convenience "wires" includes infrared, radio frequency, and other wireless links or connections. Like the network 100, a suitable network may encompass smaller networks. Alternatively, or in addition, a suitable network may be connectable to other networks through a gateway or similar mechanism.

At least one of the computers 106 is capable of using a floppy drive, tape drive, optical drive, magneto-optical drive, or other means to read a storage medium 120. A suitable storage medium 120 includes a magnetic, optical, or other computer-readable storage device having a specific physical configuration. Suitable storage devices include floppy disks, hard disks, tape, CD-ROMs, PROMs, random access memory, flash memory, and other computer system storage devices. The physical configuration represents data and instructions which cause the computer system to operate in a specific and predefined manner as described herein. Thus, the medium 120 tangibly embodies a program, functions, and/or instructions that are executable by computer(s) to protect and/or delete email message contents substantially as described herein.

Suitable software languages and tools to assist in implementing the various devices, signals, systems, and methods of the invention are readily employed by those of skill in the pertinent art(s) using the teachings presented here and programming languages and tools such as Java, Pascal, C++, C, Perl, database languages, APIs, various system level SDKs, assembly, firmware, microcode, and/or other languages and tools.

Personal Messaging with Self-Removing Messages

Figure 2:
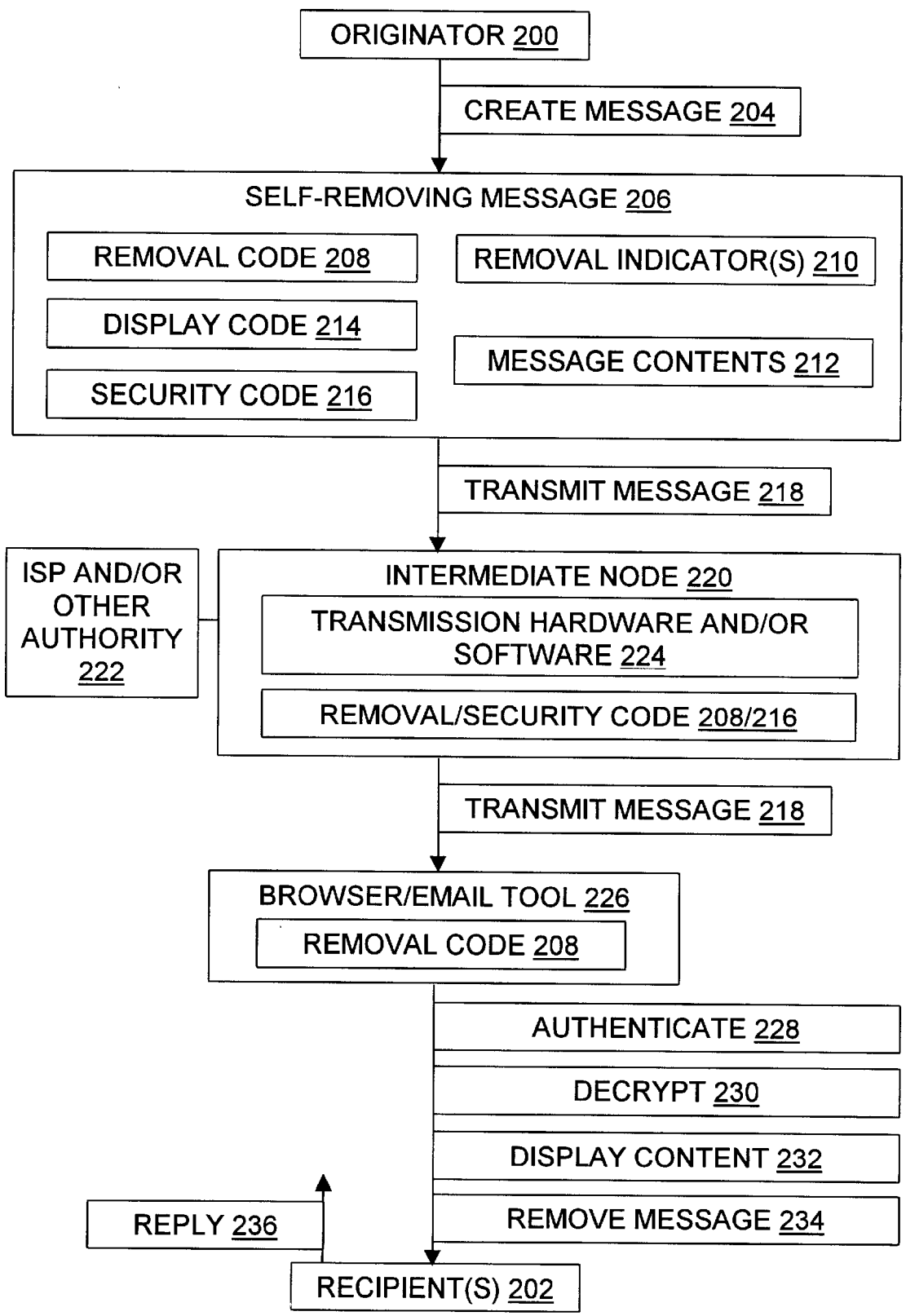
FIG. 2 is a data flow diagram illustrating a method, signal, and environment using self-removing messages to carry messages from an originator through a network to one or more recipients.

FIG. 2 illustrates a method and environment using self-removing messages to carry messages from an originator 200 at some origin to one or a few recipients 202. As used here, "a few" means less than ten recipients, or alternatively, a small number of recipients who are personally known to the originator; notices and advertisements directed to more than a few recipients are discussed elsewhere herein, although many of the tools and techniques taught herein apply regardless of whether there are only a few recipients.

During a creating step 204 the originator 200 creates a self-removing message 206 using software and hardware configured by the software, or using custom hardware alone, according to the teachings herein. This may be done generally in accordance with familiar tools and techniques for email messaging, attaching files, embedding graphics, encrypting data, and/or compressing data, but it must associate code and/or hardware 208, and/or indicators 210, with the message 206 to perform or facilitate the self-removal message management functions described here. That is, the originator 200 (or equivalently, an embodiment under the originator's direction) marks the message 206 at the origin, includes removal code 208 in the message 206, or does both. The code 208 may be embedded solely in the message 206, but it may also be embedded in plug-ins, modules, routines, objects, threads, or other forms in an ISP's transmission program 224 and/or a recipient's browser or email reception program 226, or the code 208 may be divided between one or more such locations. Code and/or hardware 208, and indicators 210, are collectively termed "self-removal enhancements" herein.

In addition to the message self-removal code 208 in the message 206 and/or elsewhere, the message 206 often includes one or more self-removal indicators 210 such as bitflags, header values, file name extensions, or other data marking the message 206, thereby identifying the entire message 206 or a portion thereof to the removal code 208 and distinguishing the message 206 from messages which are not subject to removal by the means taught herein. Of course, in a system where all messages are entirely self-removing, the indicators 210 are optional unless they are needed to detail information such as how long to display the message contents to the recipient, whether to allow recipients to scroll back through a previously displayed portion of the message contents, and so on.

The message 206 also includes content 212 meant to convey information from the originator 200 to the recipient(s) 202. The message content 212 may be in the form of text (e.g., word processor documents), images (e.g., still or motion image or video files), sounds (e.g., MP3, WAV, or other aural files), or other sensible items, and it may be inline and/or provided as attachments. Word processors, conventional email tools, and other familiar tools and techniques may be used to select and/or create the message content 212.

The message 206 optionally includes display code 214 and/or security code 216, each of which is discussed further below.

Unlike previous email systems, chat rooms, and other conventional messaging systems, the present invention thus gives message originators 200 both the opportunity and the presumed burden of marking for removal the messages 206 they originate. In conventional email systems, by contrast, recipients are burdened with removing unwanted messages. The invention promotes efficiency by having the originator 200, who knows the message contents 212 and their intended effect and is often one entity, mark the messages 206 for removal after their arrival. This is better than making one or many recipients, who did not necessarily ask to receive the message, attend to its disposal.

The invention also gives originators 200 a choice regarding the transience of their message content 212 at the recipient's location. In conventional chat rooms and instant messaging systems, by contrast, messages are ephemeral at the recipient's station regardless of whether the originator wishes them to persist there, because they often scroll off the visible display window or screen until they are beyond the recipient's reach.

During one or more transmitting steps 218 the message 206 is transmitted over the signal means 118 from the originator 200 to the recipient(s) 202. This may be done generally in accordance with familiar tools and techniques for packet formation, storage, forwarding, error handling, and/or other network 100 transmission means. As the message 206 travels over one or more networks, transmission software and/or hardware in bridges and/or routers 116, servers 108 (including without limitation ISP servers and application servers), and other network intermediate nodes 220 have access to part of all of the message. This access is facilitated by and/or subject to control by ISPs and other authorities 222, including governmental authorities. The nodes 220 operate at least in part using conventional networking tools and techniques 224.

However, the nodes 220 may be enhanced according to the present invention. For instance, message removal software and/or hardware 208 may configure the intermediate nodes 220 to provide novel capabilities which include identifying packets or other message 206 portions, up to and including the entire message 206, through the self-removal indicators 210. After they have forwarded or otherwise processed in a conventional manner those portions, these novel intermediate nodes 220 can then delete, shred, or otherwise enhance the security of the message 206 portions by removing them as taught herein.

Eventually a transmission step 218 brings the message 206 to a recipient's station 226. This may be done generally in accordance with familiar tools and techniques, including without limitation web browsers and email programs adapted according to the invention through plug-ins or other means, and protocols such as SMTP, MIME, POP, IMAP, Privacy Enhanced Mail, listserv protocols, and usenet protocols. At the recipient's station 226 the message 206 is optionally authenticated 228, optionally decrypted 230, displayed 232, removed 234, and optionally acknowledged 236. Each of these steps is discussed at various points herein; at present, the focus is on the displaying step 232 and the removing step 234.

During the displaying step 232, the message content 212 is displayed 232 to the recipient 202. This may be done immediately upon arrival of the message 206 without prompting from the recipient 202, or it may occur as a result of the message's icon or title being highlighted, opened, clicked on, or otherwise activated by the recipient 202. The displaying step 232 may limit message contents 212 to volatile memory (as opposed to disk or other non-volatile storage), may prevent forwarding of the message 206, may disable screen save functionality, may overwrite the message contents 212 shortly after displaying them, may give the recipient 202 the option of overriding some or all of these default settings, and so on, as described herein.

Finally, the message 206 is removed 234 by overwriting the window or screen that displayed it, by erasing it from disk, and/or in other ways, as discussed herein. Messages 206 may also be removed after being only partly displayed, or after sufficient time passes or some other event occurs, such as a reboot, or an browser restart.

Broadcasting with Self-Removing Messages

The novel tools and techniques illustrated in FIG. 2 can also be used when the originator 200 sends a self-removing message 206 to more than a few recipients 202. For instance, public agencies and private litigants may wish to send messages 206 containing legal notices of the type which are conventionally published in newspapers. In the case of public agencies, email address databases could be compiled in connection with tax payments, corporate and professional license registrations and renewals, driver license registrations and renewals, and similar governmental functions. Care would be taken (and appropriate legislation and/or regulations put in place) to limit or prevent the use of such governmental email address databases by private or quasi-private entities.

However, private entities may appropriately use the invention, in accordance with applicable law, to broadcast self-removing messages 206 to large target audiences. For instance, a business might send registered customers new product announcements or press releases. Likewise, a private club or organization (or a business) might send event announcements to its members (or prospects) using self-removing messages 206.

Advertising with Self-Removing Messages

One email broadcast use of particular interest to businesses is the use of email for advertising. The advertising may be mass market, or targeted demographic, or still more focused, as when a list of previous customer email addresses is used. However, conventional email advertising imposes on the recipient at the same time it solicits business from the recipient. Conventional approaches also consume storage on intermediate network nodes, thereby imposing on Internet Service Providers and similar entities (AOL, CompuServe, Prodigy, and so on).

By shifting the burden of message disposal away from recipients 202 and onto the system 100 and the originator 200, the invention reduces the tension created by simultaneously imposing on the recipient to dispose of the message and asking the recipient to investigate or purchase the advertised products or services. Reducing this tension will make email advertising better received and hence more effective.

In one embodiment, self-removing email messages 206 contain advertisements of any of a broad range of services and goods which are presently described in unsolicited mass-mailing emails, in website banner ads, in television or radio spots, in newspapers and magazines, and in other forms and media. Unlike television, radio, newspapers, and magazines, ads sent through the Internet and other electronic media can be relatively inexpensive, targeted, interactive, and/or provide hot links to web sites, newsgroups, IRC channels, and other digital network resources. Like unsolicited emails and banner ads, the messages 206 can be animated, with audio and/or visual components, and hot links. Unlike unsolicited emails and some banner ads, the self-removing message files 206 of the present invention do not require that recipients 202 affirmatively remove unwanted ads from their computer system disk or create a reply message having REMOVE in the subject, to indicate their lack of interest in the subject matter being advertised and/or conserve space.

Self-removing email tools and techniques described herein can also be used to broadcast, multicast, or otherwise transmit explicit (intended for mature audiences only) materials without requiring permanent storage of such materials on the recipient's computer system. Some people 200, 202 may find this useful for medical or health discussions, such as support groups and professionals dealing with the difficult personal and social issues arising from conditions such as breast cancer or acquired immune deficiency syndrome. Some people may also find this useful for personal entertainment using sexually explicit materials. Within the bounds allowed by law, the invention may assist such uses.

Additional Examples

Additional details regarding various embodiments of the present invention are provided below; "embodiment" refers to any system, method, signal, or configured medium according to the invention. Discussions of a given embodiment also apply to other embodiments unless indicated otherwise to one of skill in the art.

In one embodiment, a self-removing email file includes several message components 206 which display themselves in groups of one or more components each, and then self-remove 234 the displayed 232 components. The display 232 of a given group may be triggered by an event such as arrival at the recipient's system 226, the opening of an outer email envelope, the launching of a certain application, the passage of a predetermined time period, or the arrival at a predetermined date.

In one embodiment, a self-removing email file's self-removal property can be expressly overridden by the sender 200, by the recipient 202, by an intervening authority 222 such as an ISP or an authorized government agency, or by some combination of these. In some cases, the override is silent, and in others the sender 200 or recipient 202 or both are automatically notified of the override.

In some embodiments, a reply email (self-removing or not) is sent 236 automatically to the sender 200 when the recipient 202 has opened the self-removing email message 206. In some cases, the possibility of a reply is an explicit option presented to the user 200 or 202; in some of these cases, the options presented include one to send 236 a reply asking that the recipient 202 be removed from the mailing list. This allows the recipient 202 to request removal by doing little or nothing more than opening the unsolicited message 206 and clicking on a "REMOVE FROM MAILING LIST" box or button. In some embodiments, the recipient 202 is given the option of inserting text or other digital material in the reply.

In one embodiment, a message to be emailed is embedded in an executable (interpretable, etc.) file and the file 206 is emailed. When the recipient 202 tries to open the message 206 the executable portion runs an authentication operation 228. If the recipient 202 is authorized and the message file 206 has not already been opened, then an executable portion 214 of the file 206 and/or a conventional part of the recipient station 226 displays 232 the message. The message 206 then deletes itself, thereby deleting the displayed copy of the message and preventing the code that did the display from redisplaying the message later. The deletion 234 may include an electronic shredding form of deletion, which overwrites the file (possibly several times) rather than merely marking it as free.

In one embodiment, the displaying portion 214 of the executable code and the deleting portion 208 of the executable code are executed as one atomic operation, with the atomicity enforced by the operating system and/or by the particular processor on which the message file 206 executes. Tools and techniques for enforcing atomicity are well known, in the database arts and elsewhere.

In one embodiment, the message file 206 incrementally overwrites itself while incrementally displaying 232 its message, with the overwriting and displaying increments interleaved in their operation. After decrypting 230 the message to form a block of message content 212 bytes in RAM, execution of displaying code 214 and removing code 208 is interleaved as follows. The embodiment exchanges the video display bytes (which are something other than the message content 212) with the message content bytes (which are placed in a format used by the video display buffer). Several bytes at a time may also be thus exchanged. Each exchange displays another increment of the message and also overwrites part of the message content 212 with whatever was previously being displayed.

In one embodiment, the message file 206 loads itself into memory, deletes itself from disk in partial or complete performance of an active removal step 234, verifies the deletion, and only then performs the display operation 232. Concurrently with or shortly after the display, the message file may additionally overwrite itself in memory to complete step 234.

Tools and techniques familiar to those of skill in the art for self-modifying code and/or self-deleting programs such as self-deleting scripts or self-deleting installers may be helpful during implementation of particular embodiments of the invention. Likewise, techniques used in Trojan horses, worms, viruses, and other programs which hide and/or propagate themselves may be modified for use in inventive email message files 206 which destroy themselves after displaying the message they carry. For instance, tools and techniques such as those employed in U.S. Pat. No. 5,623,600 may be adapted for use in the present invention.

In some embodiments, the message file 206 installs the message content 212 (or the entire message file 206 itself) in locations on the hard disk and/or in memory which are subject to frequent overwriting once deallocated. Suitable locations include unused clusters temporarily marked as allocated in file allocation tables, or swap files, or portions of RAM that are overwritten or scrambled during a reboot. After displaying its embedded message, the embodiment then marks itself (or at least the portion containing the message) as deallocated and forces overwriting during step 234. For instance, the embodiment may force a reboot to scramble or overwrite RAM containing the message or mark temporarily allocated clusters free once more.

The message content 212 may be encrypted so it cannot be read by simply viewing the message file 206 in a debugger and looking for strings. During authentication 228, the message file 206 may also require a password or key from the recipient 202 before decrypting 230 and displaying 232 the message.

Alternatively, the message file 206 may be self-decrypting (similar in spirit to self-extracting ZIP files) once it has verified its current location 226 as the one corresponding to the intended recipient 202. Thus, copies on ISP servers or other intermediate network nodes remain encrypted, but the copy of the message file 206 at the recipient's network address will decrypt 230 when launched.

Network addresses, environmental parameters such as the surrounding processor and operating system, previously sent ID files, digital certificates, tokens (software or hardware), and other means can be used by the message file 206 to determine its present location. For instance, this can be done by checking the current IP or other network address against an address specified (directly or in terms of an email address) by the sender 200. If the email connection is available, a packet can also be sent to a specified location and the address on the response packet can be examined. Of course, the recipient's environment is not always fully known, and it can be imitated. But imposing "proper location" as a requirement for message content 212 display 232 makes it harder to gain unauthorized access to those contents 212.

In some embodiments, means are used to make the use of a debugger generally, and the use of break points or trace points in particular, result in self-destruction of the message file 206 without display of the message contents 212, or at least in a failure to decrypt and display the message content 212. Suitable means 216 include (a) timed loops with conditionals that change behavior based on the time required to execute the loop (debugging is detected as unusually slow execution); (b) checksums on the current code 208 in memory (insertion of breakpoints alters the checksum); and (c) the interrupt vector table is temporarily modified to ignore keyboard and mouse input and hence disable debugger commands (the message content 212 is displayed a preset period of time and then disappears forever).

In some embodiments, steps are taken by the security code 216 to disable the Print Screen or similar command. For instance, a search for recognized print screen routines can be made and they can be temporarily disabled. Likewise, the interrupt vector table can be temporarily modified to limit input and hence disable print screen commands.

In some embodiments, the message file 206 checks as much of the local environment as possible for other copies of itself and permanently deletes 234 them before displaying 232 the message content 212. Some embodiments only search for the message's file name in other directories, while other embodiments search for files of the same length or recently created files and then examine those files more closely, in case the copy has been renamed. Techniques used to identify viruses can also be modified to help the message file 206 identify copies of itself.

In some embodiments, techniques used in so-called "copy protection schemes" are used by the security code 216 to help prevent copying of the message file 206. The techniques are modified to allow copying by network system software as necessary for the message file 206 to travel across the network 100 from the originator 200 to the authorized recipient(s) 202.

One embodiment does not initially delete itself after displaying the message contents 212. Instead, the message file 206 removal code 208 self-modifies to become a searcher. The searcher has a limited life span, measured either by elapsed time since its inception or by the number of times the searcher or its direct ancestors have been launched for execution.

Thus, the first time the message file 206 is run, it displays 232 the message content 212, overwrites the message content 212, and notes internally that it has done so. The next N−1 times it is launched, it runs as a searcher. The searcher displays a dummy message such as "Decrypting message; please wait . . . " to gain time while actually searching for other copies and permanently deleting 234 them. After finishing the search (and performing any appropriate deletions), the searcher displays a message such as "Decryption failed. Please contact X for assistance." X might be the message originator 200, the message recipient 202, or both, and/or their corresponding system administrators. The Nth time the searcher is run, the message file (searcher) permanently deletes 234 itself. In a variation, the searcher 206 spawns additional searchers that behave in a similar manner.

In one embodiment, a timestamp representing a limited life span is embedded in the message file 206, and if the current time (as indicated by a call made on the recipient's system) indicates that the intended life span has elapsed, then the message file simply deletes itself without displaying the message contents. Tools and techniques such as those employed in U.S. Pat. No. 5,786,817 may be adapted for use in the present invention.

Signals

Although particular methods and systems embodying the present invention are expressly illustrated and described herein, it will be appreciated that apparatus, signal, and article embodiments may be formed according to methods and systems of the present invention. Unless otherwise expressly indicated, the description herein of methods of the present invention therefore extends to corresponding apparatus, signal, and articles, and the description of apparatus, signals, and/or articles of the present invention extends likewise to corresponding methods.

For instance, the message 206 may embody novel signals such as the self-removal indicators 210, and/or the various codes such as removal code 208 for performing the removing step 234, display code 214 for performing the displaying step 232, and security code 216 for performing the authenticating step 228 or other security-enhancing steps such as disabling print screen or debugger functions. The signals may be embodied in "wires" 118, RAM, disk, or other storage media or data carriers.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, flash memory, and other media readable by one or more of the computers. Each such medium tangibly embodies a program, functions, and/or instructions that are executable by the machines to perform self-removing message creation, transmission, removal, display or other method steps substantially as described herein, including without limitation methods which perform some or all of the steps illustrated in FIG. 2. To the extent permitted by applicable law, programs which perform such methods are also within the scope of the invention.

SUMMARY

In summary, the present invention provides a novel way to protect confidential and proprietary email message contents without substantially reducing the ease and convenience of email transmission. In fact, the ease of use for email recipients is increased, because they no longer need to imprecisely filter or manually remove unsolicited notices or advertisements. Message originators also have more control over the persistence of their messages after the messages are sent. This is achieved, for instance, when email messages are embedded in executable files, each of which displays its particular message once and then permanently deletes itself and any copies of itself it can find. The message files may be embodied in computer storage media or (while in transit) in network connections.

One embodiment employing message files according to the invention includes the following:

uninstaller tools and techniques as a means for locating copies of the message file;

copy protection tools and techniques as a means for preventing creation of copies of the message file except as needed by the message file originator's email sending software, by the network transmission software, and by the intended recipient's email receiving software;

encryption tools and techniques as a means for encrypting the message contents in the message file and decrypting the message contents as part of an atomic display-and-self-destruct step;

virus detection tools and techniques, and uninstaller software tools and techniques, each as a means for locating unauthorized or no longer needed (e.g., copies made along the network transmission path after the received message has been displayed) copies of the message file (or of an extracted message) to be permanently deleted;

electronic file shredder tools and techniques as a means for permanently deleting (erasing, removing, destroying) unauthorized or no longer needed copies of the message file;

self-modifying code tools and techniques as a means for deleting the message file as the message is being displayed and/or for modifying the message file to spawn and manage searcher computer processes which seek out and permanently delete unauthorized or no longer needed copies of the message file;

anti-reverse engineering and obfuscation tools and techniques, and digital signature or checksum tools and techniques, and interrupt manipulation tools and techniques, each as a means for protecting the integrity and security of the message file contents prior to authorized display of the message, each possibly in conjunction with encryption tools and techniques; and email and networking tools and techniques as a means for authorized copying and transmission of the intact message file from the originator to the intended and authorized recipient.

A particular order and grouping may be indicated in examples for method steps of the invention. However, those of skill will appreciate that the steps illustrated and discussed in this document may be performed in various orders, including concurrently, except in those cases in which the results of one step are required as input to another step. For instance, deletion from disk during step 234 may precede display of the message during step 232, and may be filed by or interleaved with deletion of message contents 212 from RAM. Likewise, steps may be omitted unless called for in the claims, regardless of whether they are expressly described as optional in this Detailed Description. For instance, encryption steps, anti-debugger steps, and screen print disabling steps are all optional actions by the security code 216, which is itself an option component in the message 206. Steps may also be repeated (e.g., transmittal between nodes during step 218), or combined (e.g., atomic display and removal steps 232 plus 234), or named differently.

The invention may be embodied in other specific forms without departing from its essential characteristics. The described embodiments are to be considered in all respects only as illustrative and not restrictive. Any explanations provided herein of the scientific, legal, or other principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for using self-removing messages, comprising the steps of creating a self-removing message at an origin and then transmitting the self-removing message toward a recipient, wherein the creating step comprises including self-removing code in the message.

2. The method of claim 1, wherein the transmitting step comprises broadcasting the message toward recipients who are not personally known to the originator.

3. The method of claim 1, wherein the method comprises creating and transmitting a self-removing message having contents which include a notice.

4. The method of claim 1, wherein the method comprises creating and transmitting a self-removing message having contents which include an announcement.

5. The method of claim 1, wherein the method comprises creating and transmitting a self-removing message having contents which include a link to a web site.

6. The method of claim 1, wherein the creating step comprises including self-modifying self-removing code in the message.

7. A computer storage medium having a physical configuration which causes a computer system to operate according to a method for using self-removing messages, the method comprising the steps of creating a self-removing message at an origin and then transmitting the self-removing message toward a recipient, wherein the creating step comprises including self-removing code in the message.

8. A computer system comprising a processor and a memory, the memory having a physical configuration which causes the computer system to operate according to a method for using self-removing messages, the method comprising the steps of creating a self-removing message at an origin and then transmitting the self-removing message toward a recipient, wherein the creating step comprises including self-removing code in the message.

9. A method for using self-removing messages, comprising the steps of displaying message content which was sent in a self-removing message, and removing message content in response to a self-removal enhancement of the self-removing message, wherein the removing step searches for copies of the message content.

10. The method of claim 9, wherein the removing step displays a dummy message while searching for copies of the message content.

11. A computer storage medium having a physical configuration which causes a computer system to operate according to a method for using self-removing messages, the method comprising the steps of displaying message content which was sent in a self-removing message, and removing message content in response to a self-removal enhancement of the self-removing message, wherein the removing step searches for copies of the message content.

12. A computer system comprising a processor and a memory, the memory having a physical configuration which causes the computer system to operate according to a method for using self-removing messages, the method comprising the steps of displaying message content which was sent in a self-removing message, and removing message content in response to a self-removal enhancement of the self-removing message, wherein the removing step searches for copies of the message content.

\* \* \* \* \*